US011202450B2

(12) United States Patent
Michalow et al.

(10) Patent No.: US 11,202,450 B2
(45) Date of Patent: Dec. 21, 2021

(54) METHODS FOR ENHANCED ROOT NODULATION IN LEGUMES

(71) Applicant: ADVANCED BIOCATALYTICS CORPORATION, Irvine, CA (US)

(72) Inventors: Andrew H. Michalow, Mission Viejo, CA (US); Carl W. Podella, Irvine, CA (US); John W. Baldridge, Newport Beach, CA (US); Michael G. Goldfeld, Irvine, CA (US)

(73) Assignee: ADVANCED BIOCATALYTICS CORPORATION, Irvine, CA (US)

( * ) Notice: Subject to any disclaimer, the term of this patent is extended or adjusted under 35 U.S.C. 154(b) by 0 days.

(21) Appl. No.: 16/792,815

(22) Filed: Feb. 17, 2020

(65) Prior Publication Data

US 2020/0253217 A1 Aug. 13, 2020

Related U.S. Application Data

(63) Continuation of application No. 15/831,316, filed on Dec. 4, 2017, now abandoned, which is a continuation of application No. 13/177,555, filed on Jul. 7, 2011, now abandoned.

(60) Provisional application No. 61/399,095, filed on Jul. 7, 2010.

(51) Int. Cl.
*A01N 63/50* (2020.01)
*A01N 25/30* (2006.01)
*A01P 21/00* (2006.01)

(52) U.S. Cl.
CPC .............. *A01N 63/50* (2020.01); *A01N 25/30* (2013.01); *A01P 21/00* (2021.08); *Y02A 40/10* (2018.01)

(58) Field of Classification Search
CPC ................................. A01N 63/32; A01N 63/50
See application file for complete search history.

(56) References Cited

U.S. PATENT DOCUMENTS

| | | | |
|---|---|---|---|
| 3,561,944 | A | 2/1971 | Battistoni et al. |
| 6,033,875 | A | 3/2000 | Bussineau et al. |
| 6,855,536 | B2 | 2/2005 | Loh et al. |
| 7,250,068 | B1 | 7/2007 | Smith et al. |
| 7,476,529 | B2 | 1/2009 | Podella et al. |
| 7,658,848 | B2 | 2/2010 | Baldridge et al. |
| 2002/0142451 | A1 | 10/2002 | Loh et al. |
| 2005/0245414 | A1 | 11/2005 | Baldridge et al. |
| 2006/0258534 | A1 | 11/2006 | Hill et al. |
| 2007/0131010 | A1* | 6/2007 | Binder ............. C05F 5/006 71/23 |
| 2008/0167445 | A1 | 7/2008 | Podella et al. |
| 2009/0308121 | A1* | 12/2009 | Reddy ............. C12R 1/01 71/6 |
| 2010/0048404 | A1 | 2/2010 | Hungenberg et al. |

FOREIGN PATENT DOCUMENTS

| | | | |
|---|---|---|---|
| WO | 2010068932 A1 | 6/2010 | |
| WO | WO-2010068932 A1 * | 6/2010 | ............... C05G 3/70 |

OTHER PUBLICATIONS

Verghese et al (Microbiology and Molecular Biology Reviews, 2012, vol. 76, pp. 115-158) (Year: 2012).*
Botha (Soil Biology and Biochemistry, 2011, vol. 43, pp. 1-8) (Year: 2011).*
Jimenez-Gomez et al. (Effective Colonization of Spinach Root Surface by Rhizobium, Biological Nitrogen Fixation and Beneficial Plant-Microbe Interactions, 2016, Springer, Book chapter, pp. 109-122) (Year: 2016).*
Doyle (Trends in Plant Science Reviews, 1998, vol. 3, pp. 473-478) (Year: 1998).*
Bethke et al. (Use of Yeast Stress-Induced Proteins and Surfactant Complex in Root Promotion for Production Agriculture and Ornamental Plant Production, Nov. 4, 2009, ASA-CSSA-SSSA International Meetings, Abstract and Recorded Presentation) (Year: 2009).*
Podella et al. (Yeast protein-surfactant complexes uncouple microbial electron transfer and increase transmembrane leak of protons, online Dec. 1, 2008, Journal of Applied Microbiology, vol. 106, pp. 140-148) (Year: 2008).*
Berovic et al. (J. of Bioscience and Bioengineering, 2007, 103(2), 135-139) (Year: 2007).*
Alan, Surfactants Discovered Among Naturally Occurring Yeasts. Science and Enterprise, Jul. 29, 2011, accessed online at: https://sciencebusiness.technewslit.com/?p=5381 (1 page).
Bethke et al., Use of Yeast Stress-Induced Proteins and Surfactant Complex in Root Promotion for Production Agricuture and Ornamental Plant Production. ASA-CSSA-SSSA International Meetings, Abstract and Recorded Presentation, Nov. 4, 2009. Found online at: https://scisoc.confex.com/crops/2009am/webprogram/Paper55307.html (1 page).
Biospringer, Pronal 5000 are spray-dried yeast extracts and peptones obtained by autolysis of brewer's yeasts (*Saccharomyces cerevisiae*). Copyright© 2007 (1 page).
Botha, The importance and ecology of yeasts in soil. Soil Biol and Biochem. Jan. 2011; 43:1-8.
International Search Report and Written Opinion issued in PCT/US2011/043110 dated Nov. 22, 2011 (7 pages).

(Continued)

*Primary Examiner* — Mark V Stevens
(74) *Attorney, Agent, or Firm* — Tanya M. Harding; Lee & Hayes, P.C.

(57) ABSTRACT

Disclosed herein are methods of increasing, enhancing, or accelerating root nodulation in a plant, accelerating growth of nitrogen fixing bacteria in nodules of a plant, increasing protein content in a plant, increasing yield of a plant, improving water retention of a plant, or reducing water use of a plant, the method comprising identifying a plant in need of root nodulation, and applying to the plant a composition comprising a protein component comprising yeast stress proteins resulting from subjecting a mixture obtained from the yeast fermentation to stress.

13 Claims, No Drawings

(56) References Cited

OTHER PUBLICATIONS

Doyle, Phylogenetic perspectives on nodulation: evolving views of plants and symbiotic bacteria. Trends Plant Sci Rev. 1998; 3: 473-478.
EPA Fact Sheet, Yeast Extract Hydrolysate from *Saccharomyces cerevisiae* (100053) Fact Sheet. U.S. Environmental Protection Agency, Office of Pesticide Programs, 2004 Feb. 2004 (2 pages).
Jimenez-Gomez et al.. Effective Colonization of Spinach Root Surface by Rhizobium, Biological Nitrogen Fixation and Beneficial Plant-Microbe Interactions, 2016, Springer, Book chapter, pp. 109-122.
Katemai, Biosurfactants from Yeast. Walailak J 2012;9(1):1-8.
NCR-103 Committee Report, Nonconventional Soil Additives: Products, Companies, Ingredients, and Claims. Oct. 2004, pp. 1-113.
Perez-Torrado et al., Monitoring Stress-Related Genes during the Process of Biomass Propagation of *Saccharomyces cerevisiae* Strains Used for Wine Making. Appl Environ Microbiol. Nov. 2005;71(11):6831-6837.
Podella et al., Yeast protein-surfactant complexes uncouple microbial electron transfer and increase transmembrane leak of protons., J Appl Microbiol. Jan. 2009;106(1):140-148.
Rajendran et al.. Enhanced growth and nodulation of pigeon pea by co-inoculation of Bacillus strains with *Rhizobium* spp, Bioresour Technol. Jul. 2008;99(11):4544-4550.
Ruis and Schuller, Stress signaling in yeast. 1995, BioEssays 1995;17(11):959-965.
Stougaard, Regulators and Regulation of Legume Root Nodule Development. Plant Physiol. Oct. 2000;124(2):531-540.
Swenson and Betts, Aerobic Fermentation and the Depletion of the Amino Acid Pool in Yeast Cells. J Gen Physiol. Jan. 1963;46(3):387-403.
Verghese et al., Biology of the Heat Shock Response and Protein Chaperones: Budding Yeast (*Saccharomyces cerevisiae*) as a Model System. Microbiol Molecular Biol Rev. 2012; 76:115-158.
Vessey and Buss, Bacillus cereus UW85 inoculation effects on growth, nodulation, and N accumulation in grain legumes: Controlled-environment studies. Can J Plant Sci. 2002;82(2):283-290.

\* cited by examiner

METHODS FOR ENHANCED ROOT NODULATION IN LEGUMES

RELATED APPLICATION

The present application is a continuation of U.S. patent application Ser. No. 15/831,316, filed Dec. 4, 2017, which is a continuation of U.S. patent application Ser. No. 13/177,555, filed Jul. 7, 2011, which claims priority to U.S. Provisional Application No. 61/399,095, filed Jul. 7, 2010, the entire disclosure of each of which is incorporated by reference herein.

FIELD OF THE INVENTION

The present invention relates to enhancement of plant growth and crop yield by applying compositions of fermentation liquids and surfactant that improve root nodulation by rhizobacteria, e.g., *Rhizobium, Bradyrhizobium, Sinorhizobium*, etc.

BACKGROUND OF THE DISCLOSURE

Legumes are plants, such as alfalfa, clover, peas, beans, lentils, lupins, mesquite, carob, soy, peanuts, locust trees (*Gleditsia* or *Robinia*), wisteria, and the Kentucky coffeetree (*Gymnocladus dioicus*), that form a symbiotic relationship between their roots and bacteria, specifically of the family Rhizobiaceae. The bacteria penetrate the plant root hairs, and then induce the formation of nodules. The plant provides the bacteria both sustenance and an energy source in the form of adenosine triphosphate (ATP) that is generated by photosynthesis. In return, the bacteria are able to fix elemental nitrogen from the atmosphere into ammonia, a usable form of nitrogen that is digestible by plants thereby providing a rich nitrogen source to the plant. This process is called nitrogen fixation. Nitrogen is the nutrient that is most frequently a limiting item to the growth of green plants and optimizing its application is a key to optimizing plant yield. The term yield will be referred to as the crop which is being grown, be it peas, soybeans, or other legume.

Legumes are generally higher in protein content than other plant families due to the availability of nitrogen from nitrogen fixation. The high protein content makes legumes one of the most important food crops for both human consumption and animal feed. Further, legumes are used in crop rotation practice to increase the nitrogen content of soils, through nitrogen fixation, for future growth seasons and to reduce the amount of fertilizer that needs to be applied. This has cost benefits to the grower and can reduce nitrogen runoff.

Each plant species requires a particular strain of *Rhizobia* species for nodulation to form. Native rhizobial populations are not typically optimized for a particular plant species unless the crop grown previously was the specific legume to be planted. To optimize the effectiveness of nodule formation, appropriate species of *Rhizobia* can be inoculated into a crop. There are three methods of inoculation, each with its own advantages and limitations; solid, liquid and freeze-dried. Solid peat-based inoculants can be applied to seed or directly to the soil. Liquid inoculants are mixed with water and applied to the seed furrow at the time of planting. To maintain viability of the live bacteria, liquid inoculants must be kept frozen or refrigerated when stored and during shipment. The handling requirements increase costs and further limit their availability through standard distribution. Seed-applied inoculants are the most commonly used and precautions in handling need to be employed to preserve the live bacteria. A key limitation with inoculating legumes to maximize yield is that even under the best storage conditions, rhizobial populations will decline over time.

The nitrogen fixation process is a transfer of electrons by oxidizing hydrogen and reducing elemental nitrogen to form ammonia. The reduction of nitrogen is an energy intensive process, and, to fix elemental nitrogen, the rhizobial bacteria gets its energy from the plant that it infects. The chemical process involves a two-part enzyme system known as nitrogenase. The system contains iron and is highly susceptible to being inactivated in the presence of oxygen. This is not a problem with anaerobic bacteria. However, nitrogen fixing aerobic bacteria, such as *Rhizobium* in the soil can overcome the problem of oxygen because they contain oxygen scavenging molecules called leghaemoglobin. In nodules, leghaemoglobin may regulate oxygen in a similar way as hemoglobin does in mammalian tissues. Nodules that are actively fixing nitrogen will appear reddish or pink, which can be evident from the exterior or when the nodule is cut open. In extreme cases the reddish color will extend into the roots themselves. Tan colored nodules are not actively fixing bacteria and white, grey or green colored nodules are doing little nitrogen fixing or could be dying.

To optimize legume crop yield it is important to maintain the proper soil fertility, high nodulation and high level of nitrogen fixing activity are the keys to maintaining nitrogen levels in legumes. Depending on the particular legume and soil conditions, the plant might obtain a small percentage or a majority of its nitrogen from fixation. Adding nitrogen fertilizer can be detrimental because some legumes don't respond to nitrogen fertilizer. In other cases, because the nitrogen fixation process is energy intensive the plant may not expend energy for nodulation if it can absorb nitrogen directly from the added fertilizer using less energy. This process uptakes less nitrogen than by fixation and yields can be compromised.

The legume is efficient in using the nitrogen that is fixed by its partner bacteria. Almost all nitrogen that is fixed is used by the plant. Higher levels of nitrogen fixation translate to higher yield. But the higher rate of nodule formation does not always translate into higher yield. Typically, only a small amount might leak to neighboring plants. Only when the plant dies does it return nitrogen to the soil and relative to the amount of biomass of stems, leaves and roots that is turned into the soil.

Inoculation methods are numerous and revolve around delivery methods and specific strains of bacteria to legume crops to increase nodulation. A key element in activating the rhizobial nodulation (nod) genes is chemical signal that is sent by the host plant through its root hairs. Infection can happen only when root hairs are present. Flavonoid compounds, such as LCO, are known to activate rhizobial nod genes. U.S. Pat. No. 7,250,068 describes methods of improving yield of a legume by treating with the addition of lipo chitooligosaccharide (LCO), where, "an LCO which can increase the photosynthetic rate, and/or growth, and/or yield of a legume, in to acting as a trigger to initiate legume symbiotic nitrogen fixation."

U.S. Pat. No. 6,855,536 states that, "Unfortunately, for most of the United States, inoculation has been shown to be ineffective. Therefore, the inoculant industry remains relatively small (approximately $20-$30 million per year)." Therefore, there is a need to provide a simple, broad based treatment to improve nodulation of legumes and eliminate or reduce the need for inoculation.

SUMMARY OF THE INVENTION

Disclosed herein are methods of increasing, enhancing, or accelerating root nodulation in a plant, accelerating growth of nitrogen fixing bacteria in nodules of a plant, increasing protein content in a plant, increasing yield of a plant, improving water retention of a plant, or reducing water use of a plant, the method comprising identifying a plant in need of root nodulation, and applying to the plant a composition comprising a protein component comprising yeast stress proteins resulting from subjecting a mixture obtained from the yeast fermentation to stress.

DETAILED DESCRIPTION OF THE EMBODIMENTS

The treatment compositions disclosed herein are based on a fermentation product that is mixed with a surfactant, where the fermentation, based on yeast, is either aerobic or anaerobic, and preferably incorporates a mechanism to stress the yeast cells to yield essentially stress proteins. The proteins and surfactant form a complex to be termed the protein/surfactant complex, or PSC. The process and compositions are described in U.S. Pat. Nos. 7,476,529 and 7,658,848 and U.S. Patent Application Nos. 20080167445, all of which are incorporated by reference herein in their entirety, especially the passages describing the fermentation processes and the stress steps following the fermentation processes.

In certain embodiments, the protein component of the compositions disclosed herein are derived from the fermentation of yeast. In some embodiments, the fermentation is an aerobic fermentation, while in other embodiments the fermentation is an anaerobic fermentation. In some embodiments, the protein systems disclosed herein are derived from an aerobic fermentation of *Saccharomyces cerevisiae*, which, when blended with surface active agents or surfactants, enhance multiple chemical functions, at ambient conditions, or during and after exposure to the extreme conditions. The protein systems disclosed herein can also be derived from the fermentation of other yeast species, for example, *Kluyveromyces marxianus, Kluyveromyces lactis, Candida utilis, Zygosaccharomyces, Pichia*, or *Hansanula*.

After the aerobic fermentation process a fermentation mixture is obtained, which comprises the fermented yeast cells and the proteins and peptides secreted therefrom. In some embodiments, the fermentation mixture can be subjected to additional stress, such as overheating, starvation, oxidative stress, or mechanical or chemical stress, to obtain a post-fermentation mixture. The post-fermentation stress causes additional proteins to be expressed by the yeast cells and released into the fermentation mixture to form the stress protein mixture. These additional proteins are not normally present during a simple fermentation process. The additional proteins are known as "stress proteins," and are sometimes referred to as "heat shock proteins". Once the post-fermentation mixture is centrifuged, the resulting supernatant comprises both the stress proteins and proteins normally obtained during fermentation. The compositions described herein comprise stress proteins.

Several, rather low molecular weight proteins can be produced by *Saccharomyces cerevisiae* during fermentation as practiced by those familiar in the art. These proteins appear when the yeast cells have been placed under stress conditions during or near the end of the fermentation process. Although referred to as "heat shock proteins," the stress conditions can occur during periods of very low food to mass concentrations, or as the result of heat shock or pH shock conditions as described in U.S. Pat. No. 6,033,875, Bussineau, et al., incorporated by reference herein in its entirety. In addition, chemical stress, oxidative stress, ultrasonic vibration and other stress conditions can cause the yeast to express the formation of heat shock proteins, more accurately termed, "stress proteins."

Conditions for the post-fermentation procedures that produce the "heat shock proteins" are described in above-incorporated U.S. patents and publications. As is clear from the passages in the '414 publication, and the passages below, the regular fermentation steps do not generate heat shock proteins. Steps that generate heat shock proteins are administered after the fermentation step. It is necessary for the generation of heat shock proteins to cause shock to the fermented yeasts. This shock includes, for example, rapid increase in the temperature, rapid change in the pH of the fermentation broth, rapid physical stress, and the like.

As used herein, the term "protein component" refers to a mixture of proteins that includes a number of proteins having a molecular weight of between about 100 and about 450,000 daltons, and most preferably between about 500 and about 50,000 daltons, and which, when combined with one or more surfactants, enhances the surface-active properties of the surfactants. In some embodiments, the protein component comprises a mixture of multiple intracellular proteins and compounds, where at least a portion of the mixture includes yeast polypeptides obtained from fermenting yeast and yeast stress proteins resulting from subjecting a mixture obtained from the yeast fermentation to stress. The "multiple intracellular proteins and compounds" includes proteins, small proteins, polypeptides, protein fragments, and the like, that are not normally expressed by yeast cells during the fermentation process. These proteins and compounds are only expressed when the yeast cells are subjected to stress and shock following the fermentation process.

In a first example, the protein component comprises the supernatant recovered from an aerobic yeast fermentation process. Yeast fermentation processes are generally known to those of skill in the art, and are described, for example, in the chapter entitled "Baker's Yeast Production" in Nagodawithana T. W. and Reed G., Nutritional Requirements of Commercially Important Microorganisms, Esteekay Associates, Milwaukee, Wis., pp 90-112 (1998), which is hereby incorporated by reference. Briefly, the aerobic yeast fermentation process is conducted within a reactor having aeration and agitation mechanisms, such as aeration tubes and/or mechanical agitators. The starting materials (e.g., liquid growth medium, yeast, a sugar or other nutrient source such as molasses, corn syrup, or soy beans, diastatic malt, and other additives) are added to the fermentation reactor and the fermentation is conducted as a batch process.

After fermentation, the fermentation product may be subjected to additional procedures intended to increase the yield of the protein component produced from the process. Several examples of post-fermentation procedures are described in more detail below. Other processes for increasing yield of protein component from the fermentation process may be recognized by those of ordinary skill in the art.

The supernatant is obtained when the fermentation broth is centrifuged and the cellular debris is separated from liquid broth. While in some embodiments, as discussed above, the supernatant of the fermentation process is used in preparing the compositions described herein, in other embodiments, the fermentation broth is used without any processing.

Therefore, in these embodiments, the mixture used in preparing the compositions described herein is the fermentation broth containing excreted proteins and polypeptides and cellular debris, and whole yeasts.

*Saccharomyces cerevisiae* is a preferred yeast starting material, although several other yeast strains may be useful to produce yeast ferment materials used in the compositions and methods described herein. Additional yeast strains that may be used instead of or in addition to *Saccharomyces cerevisiae* include *Kluyveromyces marxianus, Kluyveromyces lactis, Candida utilis* (Torula yeast), *Zygosaccharomyces, Pichia pastoris*, and *Hansanula polymorpha*, and others known to those skilled in the art.

In the first embodiment, *Saccharomyces cerevisiae* is grown under aerobic conditions familiar to those skilled in the art, using a sugar, preferably molasses or corn syrup, soy beans, or some other alternative material (generally known to one of skill in the art) as the primary nutrient source. Additional nutrients may include, but are not limited to, diastatic malt, diammonium phosphate, magnesium sulfate, ammonium sulfate zinc sulfate, and ammonia. The yeast is preferably propagated under continuous aeration and agitation between 30 to 35° C. and at a pH of 4.0 to 6.0. The process takes between 10 and 25 hours and ends when the fermentation broth contains between 4 and 8% dry yeast solids, (alternative fermentation procedures may yield up to 15-16% yeast solids), which are then subjected to low food-to-mass stress conditions for 2 to 24 hours. Afterward, the yeast fermentation product is centrifuged to remove the cells, cell walls, and cell fragments. It is worth noting that the yeast cells, cell walls, and cell fragments will also contain a number of useful proteins suitable for inclusion in the protein component described herein.

In an alternative embodiment, the yeast fermentation process is allowed to proceed until the desired level of yeast has been produced. Prior to centrifugation, the yeast in the fermentation product is subjected to heat-stress conditions by increasing the heat to between 40 and 60° C., for 2 to 24 hours, followed by cooling to less than 25° C. The yeast fermentation product is then centrifuged to remove the yeast cell debris and the supernatant, which contains the protein component, is recovered.

In a further alternative embodiment, the fermentation process is allowed to proceed until the desired level of yeast has been produced. Prior to centrifugation, the yeast in the fermentation product is subjected to physical disruption of the yeast cell walls through the use of a French Press, ball mill, high-pressure homogenization, or other mechanical or chemical means familiar to those skilled in the art, to aid the release of intracellular, polypeptides and other intracellular materials. It is preferable to conduct the cell disruption process following a heat shock, pH shock, or autolysis stage. The fermentation product is then centrifuged to remove the yeast cell debris and the supernatant is recovered.

In a still further alternative embodiment, the fermentation process is allowed to proceed until the desired level of yeast has been produced. Following the fermentation process, the yeast cells are separated out by centrifugation. The yeast cells are then partially lysed by adding 2.5% to 10% of a surfactant to the separated yeast cell suspension (10%-20% solids). In order to diminish the protease activity in the yeast cells, 1 mM EDTA is added to the mixture. The cell suspension and surfactants are gently agitated at a temperature of about 25° to about 35° C. for approximately one hour to cause partial lysis of the yeast cells. Cell lysis leads to an increased release of intracellular proteins and other intracellular materials. After the partial lysis, the partially lysed cell suspension is blended back into the ferment and cellular solids are again removed by centrifugation. The supernatant, containing the protein component, is then recovered.

In a still further alternative embodiment, fresh live *Saccharomyces cerevisiae* is added to a jacketed reaction vessel containing methanol-denatured alcohol. The mixture is gently agitated and heated for two hours at 60° C. The hot slurry is filtered and the filtrate is treated with charcoal and stirred for 1 hour at ambient temperature, and filtered. The alcohol is removed under vacuum and the filtrate is further concentrated to yield an aqueous solution containing the protein component.

The compositions described herein include one or more surfactants at a wide range of concentration levels. Some examples of surfactants that are suitable for use in the detergent compositions described herein include the following:

Anionic: Sodium linear alkylbenzene sulphonate (LABS); sodium lauryl sulphate; sodium lauryl ether sulphates; petroleum sulphonates; linosulphonates; naphthalene sulphonates, branched alkylbenzene sulphonates; linear alkylbenzene sulphonates; alcohol sulphates; PO and/or PO/EO sulfated alcohols.

Cationic: Stearalkonium chloride; benzalkonium chloride; quaternary ammonium compounds; amine compounds.

Non-ionic: Dodecyl dimethylamine oxide; coco diethanol-amide alcohol ethoxylates; linear primary alcohol polyethoxylate; alkylphenol ethoxylates; alcohol ethoxylates; EO/PO polyol block polymers; polyethylene glycol esters; fatty acid alkanolamides.

Amphoteric: Cocoamphocarboxyglycinate; cocamidopropylbetaine; betaines; imidazolines.

In addition to those listed above, suitable nonionic surfactants include alkanolamides, amine oxides, block polymers, ethoxylated primary and secondary alcohols, ethoxylated alkylphenols, ethoxylated fatty esters, sorbitan derivatives, glycerol esters, propoxylated and ethoxylated fatty acids, alcohols, and alkyl phenols, alkyl glucoside glycol esters, polymeric polysaccharides, sulfates and sulfonates of ethoxylated alkylphenols, and polymeric surfactants. Suitable anionic surfactants include ethoxylated amines and/or amides, sulfosuccinates and derivatives, sulfates of ethoxylated alcohols, sulfates of alcohols, sulfonates and sulfonic acid derivatives, phosphate esters, and polymeric surfactants. Suitable amphoteric surfactants include betaine derivatives. Suitable cationic surfactants—include amine surfactants. Those skilled in the art will recognize that other and further surfactants are potentially useful in the compositions depending on the particular detergent application.

Preferred anionic surfactants used in some detergent compositions include CalFoam® ES 603, a sodium alcohol ether sulfate surfactant manufactured by Pilot Chemicals Co., and Steol® CS 460, a sodium salt of an alkyl ether sulfate manufactured by Stepan Company. Preferred nonionic surfactants include Neodol® 25-7 or Neodol® 25-9, which are C12-C15 linear primary alcohol ethoxylates manufactured by Shell Chemical Co., and Genapol® 26 L-60, which is a C12-C16 natural linear alcohol ethoxylated to 60E C cloud point (approx. 7.3 mol), manufactured by Hoechst Celanese Corp.

Several of the known surfactants are non-petroleum based. For example, several surfactants are derived from naturally occurring sources, such as vegetable sources (coconuts, palm, castor beans, etc.). These naturally derived surfactants may offer additional benefits such as biodegradability.

One of the features of the PSC is the ability to accelerate uptake of nutrients and accelerate metabolic processes of aerobic bacteria based on a mechanism called uncoupling of oxidative phosphorylation. And it has been shown that the uncoupling effect and its benefits are observed at low temperature as well as at ambient temperatures. An effect of this feature is to limit the amount of biomass being formed, including the amount of biofilm being developed, typically based on polysaccharides. The uncoupling effect uncouples the microbe's ability to form complex proteins. Nitrogenase is a complex protein and it would be expected that the level of nitrogenase would be reduced with the uncoupling factor of the PSC. To protect the needed nitrogenase system in the nodulation process when aerobic bacteria are present, species like *Azotobacter* and *Rhizosium* (*The Microbial World: The Nirogen cycle and Nitrogen fixation*, Jim Deacon, University of Edinburgh) produce large amounts of extracellular polysaccharide to limit the rate of diffusion of oxygen into cells. The PSC treatment would appear to be detrimental to the nitrogenase based on these phenomena. The results of the tests, however, show otherwise.

The *Rhizobia* bacteria infect a plant's roots through its root hairs. We have observed that PSC treated plants had a substantially greater amount of fine root hair.

It is a hypothesis, but not a limitation of the current invention, that the mechanism for the enhanced nodulation when treated by the PSC is due to the following factors. The increased uptake of nutrient by bacteria in soil treated by the PSC accelerates the growth rate of appropriate nitrogen fixing bacteria in the plant and the plant responds in kind by increasing the amount of leghaemoglobin it produces in the nodules. The effect is noted by the intensity of the reddish color observed in the treated nodules, which can extend up into the roots. Further, since the PSC has been shown to accelerate the growth of fine root hairs, then this is believed to be an additional embodiment of the current invention that improves nodulation of legumes. The increased uptake of nutrient, as in nitrogen and Nod factors, is hypothesized to be a factor in the higher rate of nitrogen fixation, which is noted by the reddish color of the nodules.

Thus, in one aspect, disclosed herein are methods of increasing, enhancing, or accelerating root nodulation in a plant, the method comprising identifying a plant in need of root nodulation, and applying to the plant a composition comprising a protein component comprising yeast stress proteins resulting from subjecting a mixture obtained from the yeast fermentation to stress.

In another aspect, disclosed herein are methods of accelerating growth of nitrogen fixing bacteria in nodules of a legume, the method comprising identifying a legume in need thereof, and applying to the legume a composition comprising a protein component comprising yeast stress proteins resulting from subjecting a mixture obtained from the yeast fermentation to stress.

In another aspect, disclosed herein are methods of increasing protein content in a legume, the method comprising identifying a legume in need thereof, and applying to the legume a composition comprising a protein component comprising yeast stress proteins resulting from subjecting a mixture obtained from the yeast fermentation to stress.

In another aspect, disclosed herein are methods of increasing yield of a legume, the method comprising identifying a legume in need thereof, and applying to the legume a composition comprising a protein component comprising yeast stress proteins resulting from subjecting a mixture obtained from the yeast fermentation to stress.

In some embodiments of the above methods, the protein component is obtained through the processes described above. In some embodiments, the plant in need of such methods is a plant being used to increase the nitrogen content of soil during crop rotation, or a plant required to provide higher yield, or higher nutrition content, or a plant required to have reduced water use.

In some embodiments of the above methods, the composition is applied to the soil near the plant. In some of these embodiments, the composition is applied through irrigation, which can be spray irrigation or drip irrigation. In certain embodiments, the composition is applied with every watering cycle or, in other embodiments, on an intermittent basis.

In some embodiments of the above methods, the protein component is from aerobic fermentation of yeast. In some of these embodiments, the protein component comprises proteins obtained from exposing a product obtained from the fermentation of yeast to additional procedures that increase the yield of proteins produced from the fermentation. In certain embodiments, the stress is selected from the group consisting of heat shock of the fermentation product, physical and/or chemical disruption of the yeast cells to release additional polypeptides, and lysing of the yeast cells. In further embodiments, the stress comprises exposing a product obtained from the fermentation of yeast to heat shock conditions. In some embodiments, the stress comprises physically disrupting the yeast after the fermentation of the yeast, while in other embodiments, the stress comprises chemically disrupting the yeast after the fermentation of the yeast. In some embodiments, the stress comprises lysing the yeast after the fermentation of the yeast.

In some embodiments of the above methods, the methods further comprise mixing the protein component with additional nutrients prior to the application to the plant. The additional nutrients include, but are not limited to, fertilizers, sources of phosphate, minerals, herbicides, and insecticides.

In some embodiments of the above methods, the composition further comprises one or more of an anionic surfactant, a non-ionic surfactant, a cationic surfactant, and amphoteric surfactant, as described elsewhere herein.

In some embodiments of the above methods, the yeast is selected from the group consisting of *Saccharomyces cerevisiae, Kluyveromyces marxianus, Kluyveromyces lactis, Candida utilis* (Torula yeast), *Zygosaccharomyces, Pichia pastoris*, and *Hansanula polymorpha*.

In some embodiments of the above methods, the plant is a legume. In certain embodiments, the legume is selected from the group consisting of alfalfa, clover, peas, beans, lentils, lupins, mesquite, carob, soy, peanuts, locust trees (*Gleditsia* or *Robinia*), wisteria, and the Kentucky coffeetree (*Gymnocladus dioicus*).

In other embodiments of the above methods, a volume of soil is premixed with the above composition to form a mixture, and then the mixture is applied to the plant. Thus, in another aspect, disclosed herein is a soil mixture comprising soil and a composition comprising a protein component comprising yeast stress proteins resulting from subjecting a mixture obtained from the yeast fermentation to stress, as described above.

In another aspect, disclosed herein are methods of improving water retention of a legume, reducing water use of a legume, accelerating root nodulation in a legume, accelerating nitrogen fixation by a legume, accelerating growth of nitrogen fixing bacteria in nodules of a legume, increasing protein content in a legume, or increasing yield of a legume, the method comprising identifying a legume in need thereof, and applying to the legume a soil mixture as described above.

In some embodiments of the above methods, the methods further comprises inoculating the soil with bacteria prior to the application of the composition. In other embodiments, the methods are practiced without inoculation of the soil with any bacteria.

In yet another aspect, disclosed herein are methods of increasing the tolerance of a legume to colder climates, the method comprising identifying a legume in need thereof, and applying to the legume a protein component comprising yeast stress proteins resulting from subjecting a mixture obtained from the yeast fermentation to stress, as described above.

Example 1

A fermentation mixture derived from the fermentation of *Saccharomyces cerevisieae* in which the yeast cells are stressed by raising the temperature to at least 35° C. for at least two hours, then cooling to <30° C. centrifugation. Upon removal of the yeast cells by centrifugation the pH is adjusted to 4.0 and sodium benzoate and 21.1% propylene glycol is incorporated to provide stability.

| PSC | |
|---|---|
| Linear Primary Alcohol (C12-C15), 7 mole Ethoxylate | 7.5% |
| Sodium Lauryl Ether (3 mole) Sulfate (60%) | 2.5% |
| Stabilized Fermentation Mixture | 23% |
| Water | 67% |
| TOTAL | 100% |

Host Plants:
Peas, *Pisum sativum*. Two seeds were sown in 6 inch diam pots (approx. 3500 ml volume) filled with UC Mix II (Matkin and Chandler 1957). Soil Mix II is formulated with plaster sand, bark, peat moss, Dolomite, limestone flour, triple super phosphate, potassium nitrate, muriate of potash, ferrous sulfate, copper sulfate, magnesium sulfate, zinc sulfate, and manganese sulfate. Once sown, the pots were watered on a daily basis until the plant was visible above ground. The resulting plants were culled to one plant per pot at the cotyledon (seed leaf) stage. Treatment applications commenced following culling.

Host Plant Care:
Plants were placed on raised greenhouse benches for study. The plants were fertilized with Miracle-Gro (with minors) general-purpose fertilizer at 200 ppm nitrogen. Fertigation protocol was such that each plant in the experiment received the same amount of fertilizer throughout the experiment.

Applications:
A control treatment of water only was used in this experiment. Protein Surfactant Combination PSC was applied by hand at 75 ppm three times a week. Product was added to water at the appropriate concentration such that each plant received 90 ml of solution at every application. Water at 90 ml was added to each control plant when treatment applications were performed.

Experimental Design:
There were eight plants that were treated and the number of treatments of control pots that had no PSC treatment.

Sampling:
A destructive sample was taken at 30 and 60 days after treatment initiation. Root weight and rhizome production were determined.

Results
Mean (grams±SE) dry weight of roots and the number and dry weight of rhizomes of sweet peas treated with selected protein surfactant combinations.

| Treatment | Mean root dry weight[1] | Mean no. of rhizomes[2] | Mean dry weight of rhizomes[1] |
|---|---|---|---|
| PSC | 2.16 ± 0.15a | 49.2 ± 12.7a | 0.086 ± 0.014 |
| Control | 1.93 ± 0.14a | 31.6 ± 12.6a | 0.040 ± 0.014 |

[1]Means followed by different letters are significantly different, LSD ($p = 0.05$)
[2]Means are significantly different at $p = 0.01$, ChiSq = 5.11, df = 2, P = 0.0775.

DISCUSSION

The PSC nodules were more than twice the weight of the Control and there were 56% more nodules than the Control. Further, the PSC treated nodules were reddish in color, indicating a high level of nitrogen fixation. The Control nodules had a brownish color, indicating little nitrogen fixation. This suggest a higher protein content and higher crop yield.

What is claimed is:

1. A method of increasing, enhancing, or accelerating root nodulation in a legume plant, accelerating growth of nitrogen fixing bacteria in nodules of a legume plant, increasing protein content in a legume plant, increasing yield of a legume plant, improving water retention of a legume plant, or reducing water use of a legume plant, the method comprising:
    identifying a legume plant in need of root nodulation, and applying to the legume plant a composition comprising:
        23% by volume of a protein component comprising yeast stress proteins resulting from subjecting a mixture obtained from the yeast fermentation to stress;
        7.5% by volume ethoxylated linear primary C12-C15 alcohol;
        2.5% by volume sodium lauryl ether sulfate; and
        water to 100% volume;
    wherein the protein component comprising yeast stress proteins is produced by the method comprising:
        growing *Saccharomyces cerevisiae* under aerobic fermentation conditions to obtain a fermentation mixture comprising fermented yeast cells, and proteins and peptides secreted therefrom;
        subjecting the fermentation mixture to stress comprising heating the fermentation mixture to 40-60° C. for at least 2 hours followed by cooling to 25° C. in order to stimulate the *Saccharomyces cerevisiae* cells to express heat shock proteins to obtain a stressed fermentation mixture;
        centrifuging the stressed fermentation mixture to separate a solid/precipitate from a supernatant; and
        adding sodium benzoate and propylene glycol to the supernatant to produce the protein component comprising yeast stress proteins.

2. The method of claim 1, wherein the composition is applied to the soil near the plant.

3. The method of claim 1, wherein the composition is applied through irrigation.

4. The method of claim 3, wherein the irrigation is spray irrigation or drip irrigation.

5. The method of claim 1, wherein the composition is applied with every watering cycle or on an intermittent basis.

6. The method of claim 1, wherein the aerobic fermentation conditions comprise continuous aeration and agitation between 30 to 35° C. and at a pH of 4.0 to 6.0 for a period of at least 10 hours.

7. The method of claim 1, wherein the stress further comprises physically or chemically disrupting the *Saccharomyces cerevisiae* after fermentation of the *Saccharomyces cerevisiae*.

8. The method of claim 1, wherein the stress further comprises lysing the *Saccharomyces cerevisiae* after fermentation of the *Saccharomyces cerevisiae*.

9. The method of claim 1, further comprising mixing the protein component with additional nutrients prior to the application to the plant.

10. The method of claim 1, wherein the composition further comprises one or more of an anionic surfactant, a non-ionic surfactant, a cationic surfactant, and amphoteric surfactant.

11. The method of claim 1, wherein the legume plant is selected from the group consisting of alfalfa, clover, peas, beans, lentils, lupins, mesquite, carob, soy, peanuts, locust trees (*Gleditsia* or *Robinia*), wisteria, and the Kentucky coffeetree (*Gymnocladus dioicus*).

12. A soil mixture comprising soil and a composition comprising:
  23% by volume of a protein component comprising yeast stress proteins resulting from subjecting a mixture obtained from the yeast fermentation to stress;
  7.5% by volume ethoxylated linear primary C12-C15 alcohol;
  2.5% by volume sodium lauryl ether sulfate; and
  water to 100% volume;
wherein the protein component comprising yeast stress proteins is produced by the method comprising:
  growing *Saccharomyces cerevisiae* under aerobic fermentation conditions to obtain a fermentation mixture comprising fermented yeast cells, and proteins and peptides secreted therefrom;
  subjecting the fermentation mixture to stress comprising heating the fermentation mixture to 40-60° C. for at least 2 hours followed by cooling to 25° C. in order to stimulate the *Saccharomyces cerevisiae* cells to express heat shock proteins to obtain a stressed fermentation mixture;
  centrifuging the stressed fermentation mixture to separate a solid/precipitate from a supernatant; and
  adding sodium benzoate and propylene glycol to the supernatant to produce the protein component comprising yeast stress proteins.

13. A method of improving water retention of a legume plant, reducing water use of a legume plant, accelerating root nodulation in a legume plant, accelerating nitrogen fixation by a legume plant, accelerating growth of nitrogen fixing bacteria in nodules of a legume plant, increasing protein content in a legume plant, or increasing yield of a legume plant, the method comprising:
  identifying a legume plant in need thereof, and
  applying to the legume plant the soil mixture of claim 12.

* * * * *